(12) United States Patent
Lakeman et al.

(10) Patent No.: US 6,506,511 B1
(45) Date of Patent: Jan. 14, 2003

(54) MULTI-ELEMENT FUEL CELL SYSTEM

(75) Inventors: John B Lakeman, Haslar (GB); Ranulf Slee, Haslar (GB); Kevin J Green, Haslar (GB); John M Cruickshank, Haslar (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/674,074

(22) PCT Filed: May 5, 1999

(86) PCT No.: PCT/GB99/01391

§ 371 (c)(1),
(2), (4) Date: Oct. 26, 2000

(87) PCT Pub. No.: WO99/60642

PCT Pub. Date: Nov. 25, 1999

(30) Foreign Application Priority Data

May 16, 1998 (GB) .............................................. 9810440

(51) Int. Cl.[7] ................................................. H01M 8/10
(52) U.S. Cl. ............................................ 429/31; 429/34
(58) Field of Search .............................. 429/31, 32, 34, 429/35, 36, 38, 39, 44

(56) References Cited

U.S. PATENT DOCUMENTS 4,774,153 A  9/1988 Sterzel 5,458,989 A  * 10/1995 Dodge .......................... 429/31

FOREIGN PATENT DOCUMENTS

WO          97/47052        12/1997

* cited by examiner

*Primary Examiner*—Patrick Ryan
*Assistant Examiner*—Monique Wills
(74) *Attorney, Agent, or Firm*—Nixon & Vanderhye P.C.

(57) ABSTRACT

A multi-element fuel cell system comprises a substantially cylindrical former (2), a rechargeable hydrogen fuel source (3) and a plurality of fuel cell elements (4). The former comprises a series of interconnecting modules each perforated to allow passage of fuel to the fuel cell elements. Each fuel cell element (4) is positioned radially outwardly of the former (2) and is provided with channels, arranged to receive and direct fuel gas, an anode current collector, a gasket (12), a first diffusion backing layer (8), a membrane electrode assembly (10), a second diffusion backing layer (9) and a cathode current collector (11). The cathode current collector applies even compression to the fuel cell element, such that good electrical contact is maintained within each fuel cell element. The fuel cell elements are electrically connect in series via respective anode and cathode current collectors and then capped at each end of the former for connection to equipment. The former and current collectors have substantially the same coefficient of thermal expansion and the fuel source is coupled to the fuel cell elements. The system is suitable for man-portable applications.

18 Claims, 9 Drawing Sheets

MULTI-ELEMENT FUEL CELL SYSTEM

TECHNICAL FIELD

This invention relates to a multi-element fuel cell system as well as methods for their production.

BACKGROUND

Fuel cells have potential for any application which is currently met by batteries, with the advantages of higher energy per unit weight and volume than batteries. Existing fuel cells require endplates and clamping straps to prevent fuel leakage and minimising surface contact resistances making them too heavy and bulky for use in man-portable equipment.

U.S. Pat. No. 5,336,570 proposes a fuel cell arrangement in which planar cells are positioned opposite one another and sealed at each edge to form a hydrogen store between them, then rolled up on a separator screen to maintain oxygen flow to each cell. Alternatively, single cells are constructed as a closed, generally tubular shape. However, to increase the available power, multiple cells must be connected in an array so extra weight is added in the electrical connections and in provision of a hydrogen supply to each separate cell or pair of cells.

SUMMARY OF THE INVENTION

In accordance with a first aspect of the present invention, a multi-element fuel cell system comprises a substantially cylindrical former; a rechargeable hydrogen fuel source; and a plurality of fuel cell elements; wherein the former comprises a series of interconnecting modules; wherein each former module is perforated to allow passage of fuel to the fuel cell elements; wherein each fuel cell element is positioned radially outwardly of the former; each element being provided with channels, arranged to receive and direct fuel gas, an anode current collector, a gasket, a first diffusion backing layer, a membrane electrode assembly, a second diffusion backing layer and a cathode current collector; wherein the cathode current collector applies even compression to the fuel cell element, such that good electrical contact is maintained within each fuel cell element; wherein the fuel cell elements are electrically connected in series via respective anode and cathode current collectors; wherein the fuel cell elements at each end of the former are capped for connection to equipment; wherein the former and current collectors have substantially the same coefficient of thermal expansion; and wherein the fuel source is coupled to the fuel cell elements.

The present invention provides for a fuel cell system which has sufficient power in a man portable size and weight by virtue of a former composed of a series of interconnected former modules on which are mounted fuel cell elements all with access to the same source of hydrogen, reducing the number of end caps and amount of extraneous fuel supply equipment required for the same power output. This feature allows a fuel cell system to be constructed to any required size using only one fuel source. This is crucial for the design of man portable equipment where power to weight ratio must be maximised and is a feature which has not been addressed in any prior art. An additional design advantage of the invention is one of ease of repair in use. A former module containing a defective fuel cell element can simply be replaced allowing the continued use of the power source. Replacement modules may be supplied with man portable equipment with little weight penalty thereby ensuring equipment effectiveness in remote areas where backup support is limited. Further, the invention uses one of the current collectors to provide compression, such that good electrical contact (i.e. surface resistance minimised) is maintained within each fuel cell element, avoiding the use of an additional non-functional element. In addition, the coefficients of thermal expansion for the current collector and former are chosen to be similar, so that thermal cycling does not cause a reduction in performance because of an increase in interfacial resistance due to a reduction in the level of compression over time.

Examples of former material include Tufnol™ and stainless steel. These materials have very similar coefficients of thermal expansion so that thermal cycling in operation has minimal effect on efficiency. Preferably, the cathode current collector and the former comprise stainless steel. Where the former is made of stainless steel, preferably the former acts as the anode current collector.

Another cause of loss of performance, particularly when the system is operating at high ambient temperatures is dehydration. At higher current densities, cell performance degrades steadily with time. The rise in temperature at higher currents, and electro-osmosis can both contribute to increased rate of loss of water from the polymer electrolyte membrane of the membrane electrode assembly. Since the membrane's conductivity is dependent on how much absorbed water it contains, the system's performance will suffer as the membrane dries out. In equilibrium, the membrane needs to be kept fully moist, but not have so much water that the cell is flooded, so the rate of generation and loss of water need to be kept in balance. Water management may be further aided by the use of a suitably treated gas diffusion layer, such as Carbel™ or Carbel CL™, manufactured by W. L. Gore and Associates, USA, which assists by helping to maintain the water content of the MEA at, or about, the optimal level.

Preferably, the system further comprises an outer porous, hydrophobic layer, such that rate of loss of water from the membrane electrode assembly during operation is optimised, without affecting air transport. This layer is preferably chosen from one of perforated cellulose wrapping, man-made fibrous cloth, water-proofed cotton cloth, expanded polystyrene and polyimide foam.

Alternatively or additionally, a fine weave wire mesh may be provided inside the cathode current collector. This will also shield the surface of the assembly from excessive water loss through exposure to the air, and so help maintain or improve performance.

Preferably, the system further comprises an impervious outer shell and means for ensuring air flow to the fuel cell elements beneath the outer shell. The use of an external container helps to optimise the ambient humidity, thus also helping with performance. The air flow may be achieved using a small fan at one end of the tube or providing a separate oxygen supply. The separate oxygen supply is suitable where the ambient air contains contaminants, for example urban pollutants such as benzene or carbon monoxide. The oxygen supply allows the system to be sealed to prevent ingress of pollutants which reduce performance, yet allowing continued operation.

Preferably, the hydrogen fuel source comprises one of a hydrogen store or a hydrogen generator. A hydrogen store may be refilled with hydrogen, whereas hydrogen generators need replacement, but give generally better performance for the same weight.

Preferably, the hydrogen source comprises a metal hydride of up to 2 wt% $H_2$, a primary hydride, compressed hydrogen or hydrogen stored in carbon nanofibres.

Preferably, the rechargeable hydrogen source is provided in a replaceable cartridge. This would make replacement of the source by the user practical.

Any suitable catalyst may be used in the membrane electrode assembly, but preferably the catalyst comprises platinum deposited on a carbon support. To further improve performance, preferably, the catalyst comprises between 0.2 and 1.0 mg of platinum per $cm^2$.

In accordance with a second aspect of the present invention, a method of manufacturing a multi-element fuel cell comprises providing a cathode current collector, a first diffusion backing layer, a membrane electrode assembly, and a second diffusion backing layer to form a stack; folding the stack around a former; applying a predetermined pressure to the cathode current collector to ensure good contact between the stack and the former; fastening the cathode current collector in place to form a fuel cell element; and connecting a plurality of fuel cell elements together to form a fuel cell.

An embodiment of a method of manufacturing a multi-element fuel cell system of the invention, comprises extruding a series of substantially cylindrical former modules wherein the former modules act as the anode current collector; perforating the former modules; applying a first diffusion backing layer, a membrane electrode assembly, a second diffusion backing layer and a cathode current collector in register with the anode current collector to form individual fuel cell elements; fastening the cathode current collector such that it applies compression to the fuel cell element; assembling a series of complete fuel cell elements to produce a cell of the required size and connecting the anode current collector and cathode current collector of adjacent fuel cell elements in series; capping each end and providing connectors for connecting to equipment in use.

The present invention allows fuel cells to be manufactured to different power specifications using the same production process. Furthermore, one or more multi-element fuel cells of the invention may be linked together, in any suitable configuration to create a larger power source. The connection could, for example, be arranged in such a way that although the width of the overall power source may be increased, its length is not affected, if that is desirable in the particular situation in which the fuel cells are to be used.

Preferably, the method further comprises applying a porous, hydrophobic layer over the cathode current collector, such that rate of loss of water from the system is optimised.

BRIEF DESCRIPTION OF THE DRAWINGS

The invention will now be particularly described by way of example with reference to the accompanying drawings in which.

DETAILED DESCRIPTION OF THE PREFERRED EMBODIMENTS

Figures 1, 2:
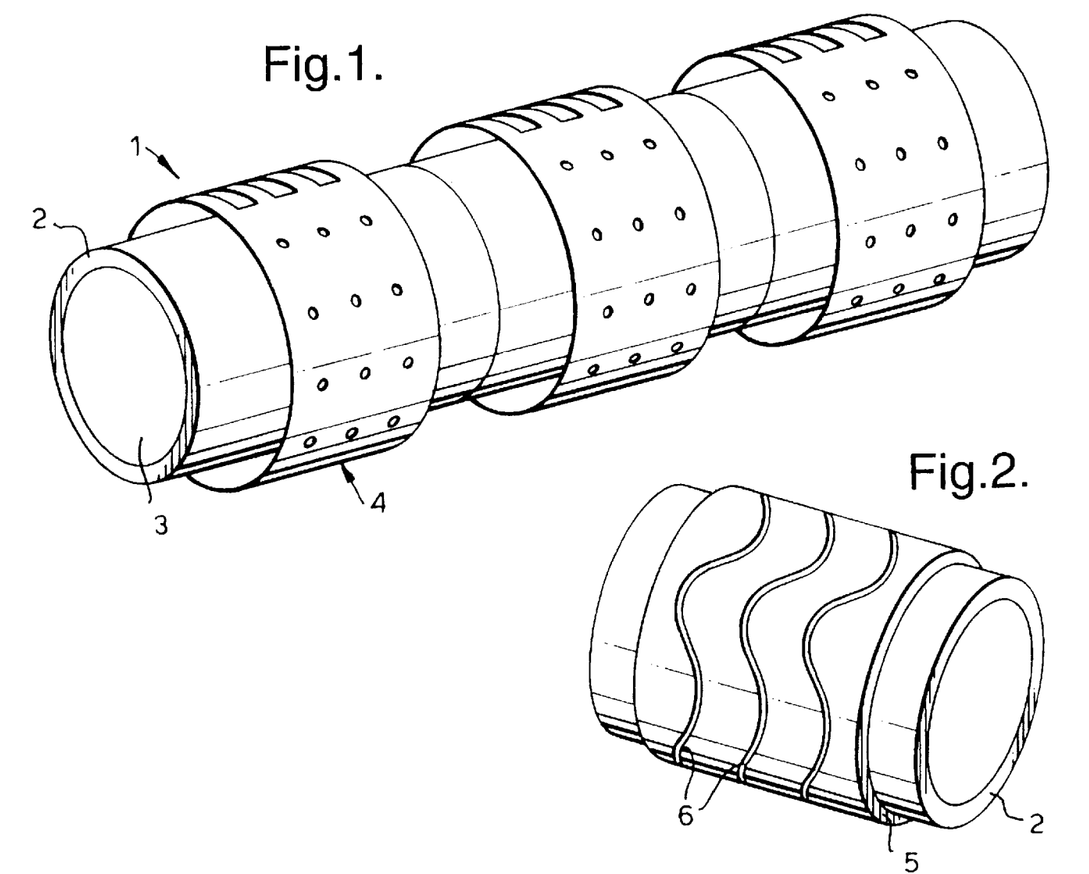
FIG. 1 is a side view of an example of a fuel cell system in accordance with the present invention.
FIG. 2 illustrates a possible arrangement of a channelled flexible layer which may be used in the fuel cell of the invention.

FIG. 1 illustrates a fuel cell system according to the invention. The system 1 comprises a former 2 made up of interconnecting modules of stainless steel tube with perforations (not shown), although Tufnol™ or other suitable materials may be used, and a fuel source 3. Discrete fuel cell elements 4 are mounted on the former in register. In this example, the former 2 also acts as an anode current collector, but where a Tufnol™ former is used a first electrically conductive layer (the anode current collector) is provided, preferably in the form of a metal foil which may be mounted on a flexible layer 5 provided with channels 6 to receive and direct fuel gas as shown in detail in FIG. 2. The flexible layer may be made of a plastic material or graphite, in particular an exfoliated graphite sheet, positioned intermediate the former and the anode current collector. Under compression within the assembled fuel cell element, the layer moulds itself into any flaws in the former assembly, and so prevents any potential gas leaks. This layer may be perforated as for the former and the anode current collector so as to allow fuel gas to pass through. However, preferably tracks will be cut into the layer which act as channels for the gas. The tracks are arranged to receive gas exiting from the perforations in the former and then to distribute it across the membrane electrode assembly. The tracks may be varied in shape, but a simple repeating 'S' shape is a particular example. The even distribution of fuel in this way further improves cell performance.

A particularly suitable material for the flexible layer is an exfoliated graphite sheet such as that obtainable from James Walker Ltd. UK. This material is soft enough so that it moulds itself as a gasket, sealing potential leaks, but has a thickness sufficient to allow tracks or channels to be sustained in it.

Figure 3:
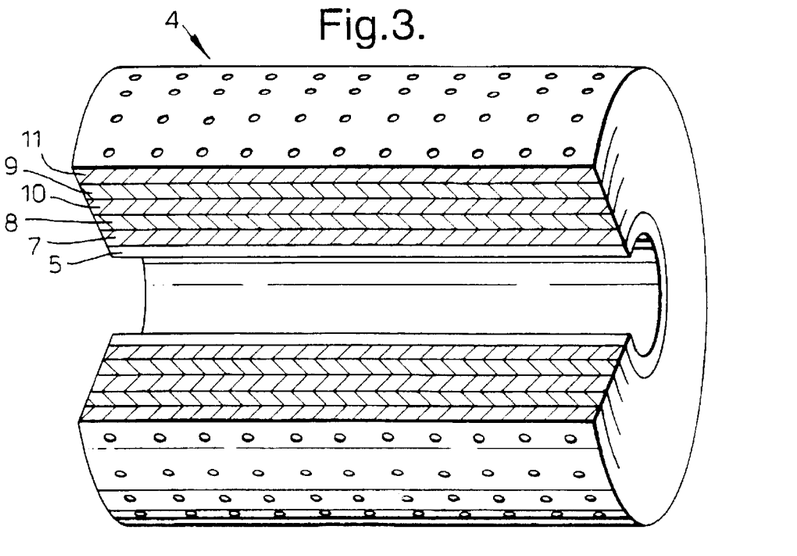
FIG. 3 illustrates a partial section through a single fuel cell element of the system of FIG. 1 showing the active components.
Figure 4A:
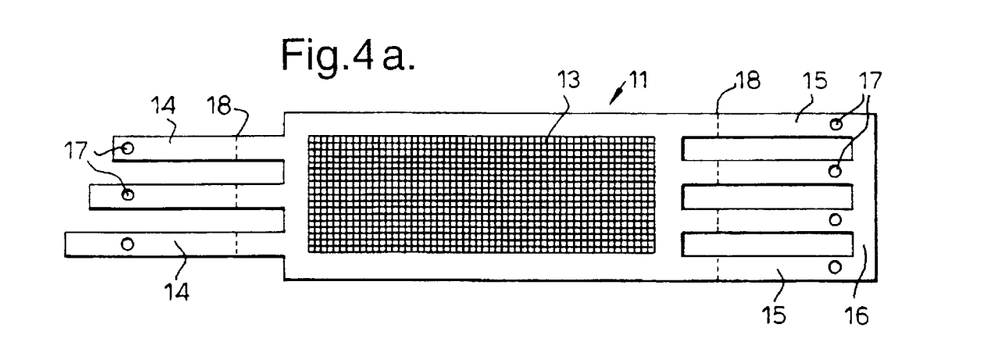
FIG. 4 shows an example of a cathode current collector suitable for the fuel cell element of FIG. 2.
Figure 4B:
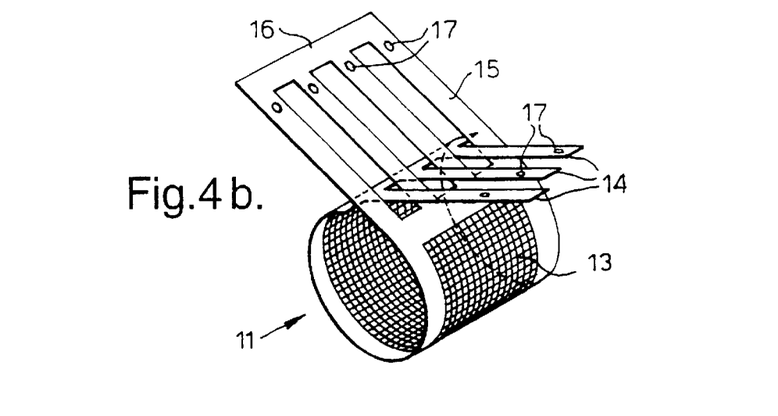
Figure 5A:
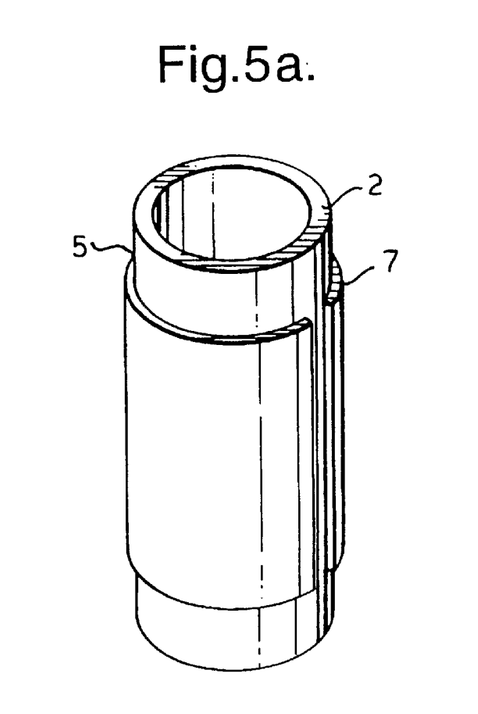
FIGS. 5(a)–(f) illustrates diagrammatically the layers of the assembly of FIG. 3.
Figure 5B:
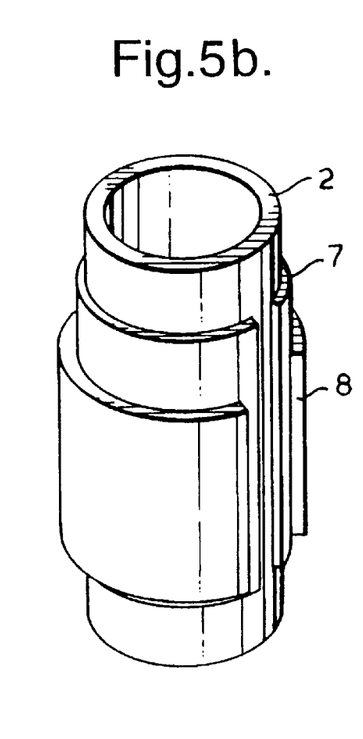
Figure 5C:
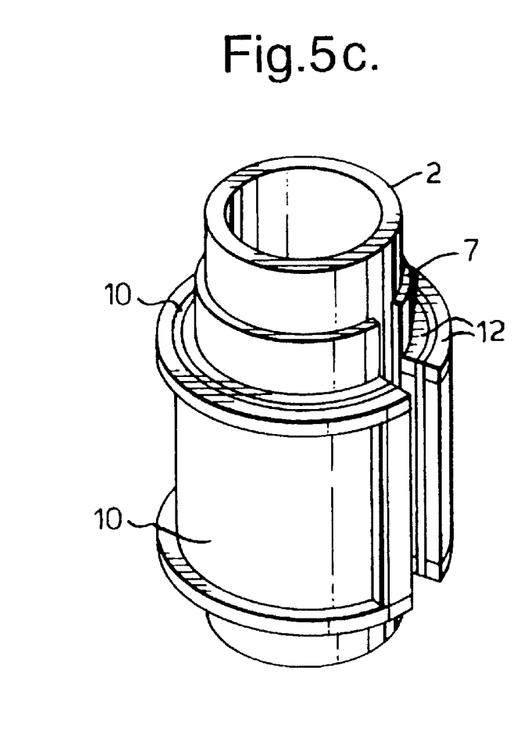
Figure 5D:
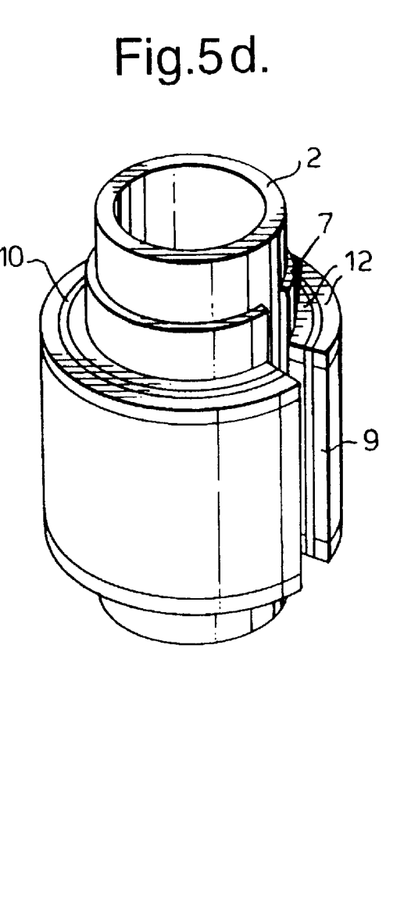
Figure 5E:
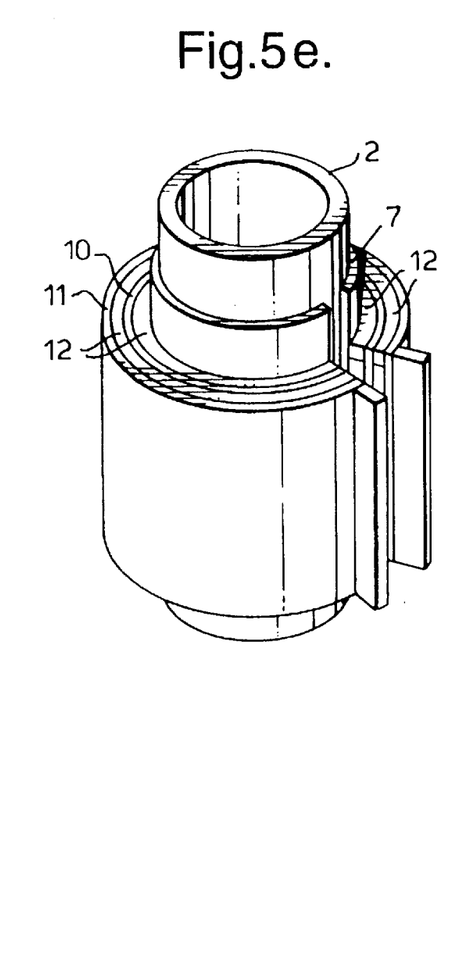
Figure 5F:
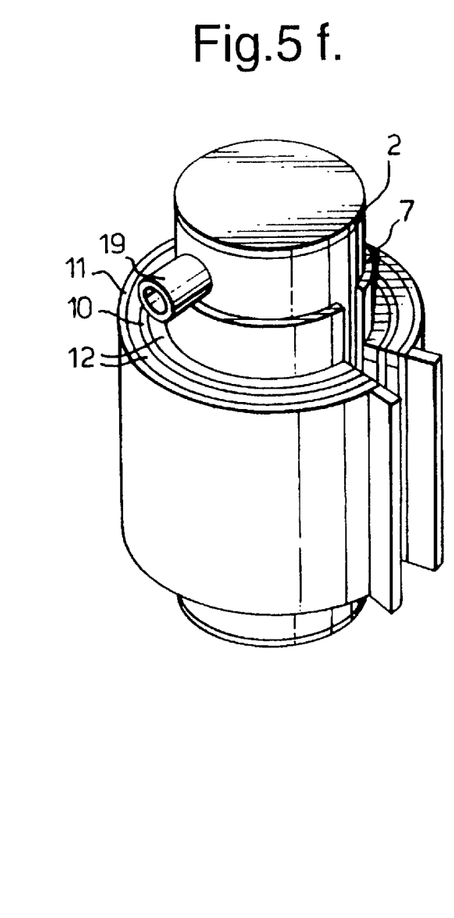

The other layers of the fuel cell element are illustrated in more detail in FIG. 3. The fuel cell element 4 comprises the optional anode current collector 7, first and second diffusion backing layers 8, 9 either side of a membrane electrode assembly (MEA) 10, and a second electrically conductive layer (cathode current collector) 11. Each diffusion backing layer is provided with an annular gasket 12 as shown in FIGS. 5c–f at either end in order to seal it against the MEA 10 or the cathode current collector 11. The cathode current collector 11, shown in detail in FIGS. 4a–b is formed by photo-fabrication in stainless steel, so it is thin and in soft condition and keeps its shape, if bent. It has a perforated area 13 and tabs 14, 15 at each end which are designed to interleave. The tabs 15 are joined together at their outer end 16 as a set of four tabs, and three tabs fit through the gaps formed between these four. The tabs are provided with attachment holes 17 in the ends and perforations 18 near the base of each tab to assist in the manufacturing process.

The construction of the layers of the fuel cell element on the former, including the optional flexible layer 5 and anode current collector 7, is shown in FIG. 5. The flexible layer 5 and the anode current collector 7 are mounted on a portion of the former 2 (FIG. 5a) and this in turn is partly surrounded by a gasket 12 (FIG. 5c) which contacts the first diffusion backing layer 8, for example, an E-Tek or Carbel carbon cloth (FIG. 5b). The MEA 10 is then provided around the layers, followed by a second diffusion backing layer 9 (FIG. 5d) which is also surrounded by a gasket 12. The cathode current collector 11 (FIG. 5e) is applied in such a way that it applies an even compression to the inner components. The former 2 may then be closed at the ends and connected to a fuel source by way of a connecting tube 19 (FIG. 5f) or a fuel source (not shown) provided within the former.

The individual modules of the former may be prepared by extrusion, for example, then holes drilled to allow gas flow. Individual modules are connected together, for example using gaskets, "O" rings or interconnecting units which may be mouldable, so as to provide a gas tight seal. The modules may be connected together either before, or preferably after construction of individual fuel cell elements thereon. A modular arrangement of this type provides advantages in terms of ease of construction. Furthermore, individual modules may be replaced should a problem develop within the fuel cell element thereon, without the need to abandon the entire multi-element fuel cell. The individual modules may be held together by a tie-rod down the centre of the tube, the tie-rod being secured in end plates at each end of the stack, although this is not suitable where a fuel store is to be provided inside the fuel cell elements. The tie-rod may further act as a gas distribution unit.

Figure 6:
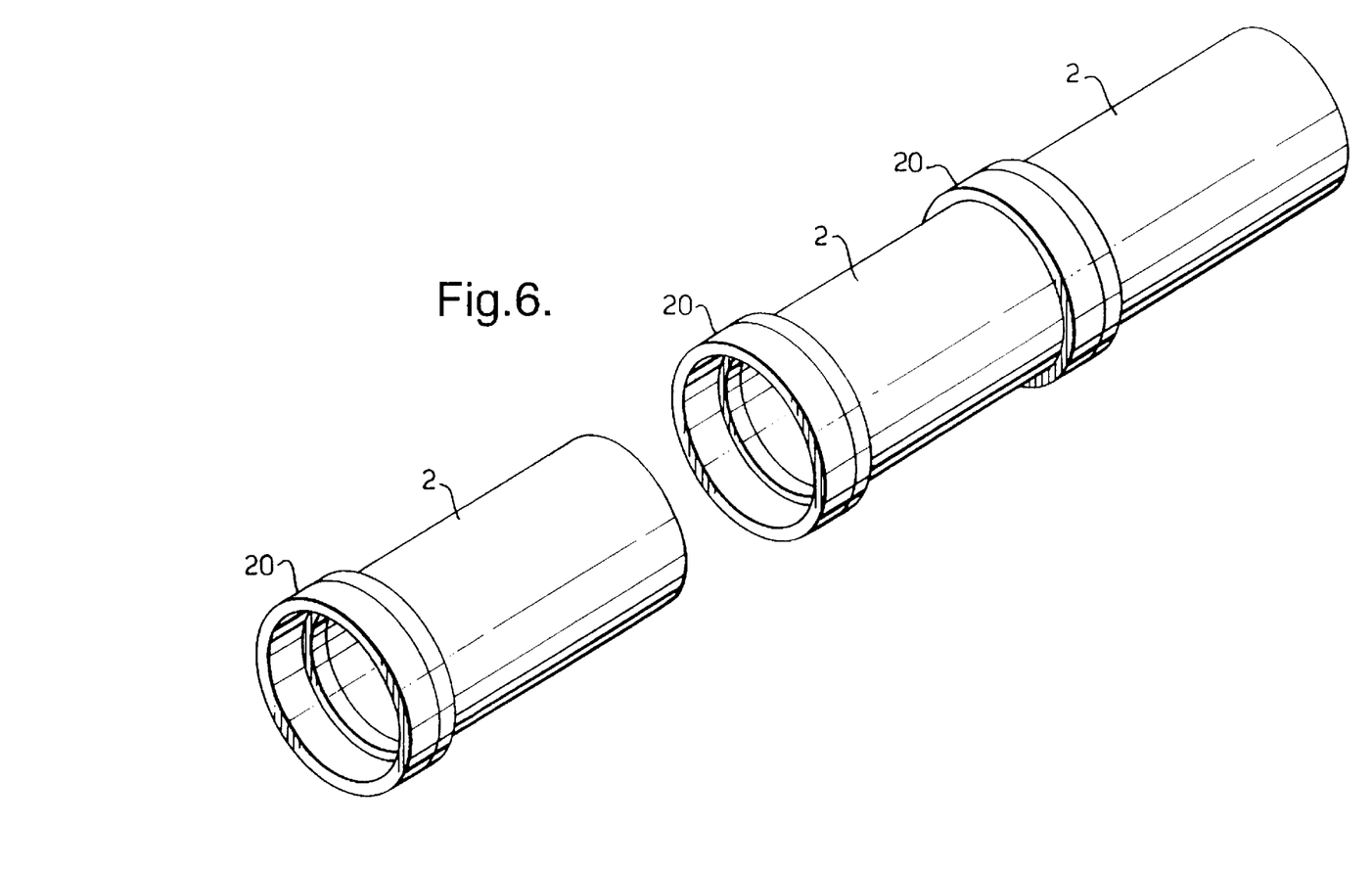
FIG. 6 is an exploded view of a modular former which may be used in the fuel cell of the invention.
Figure 7:
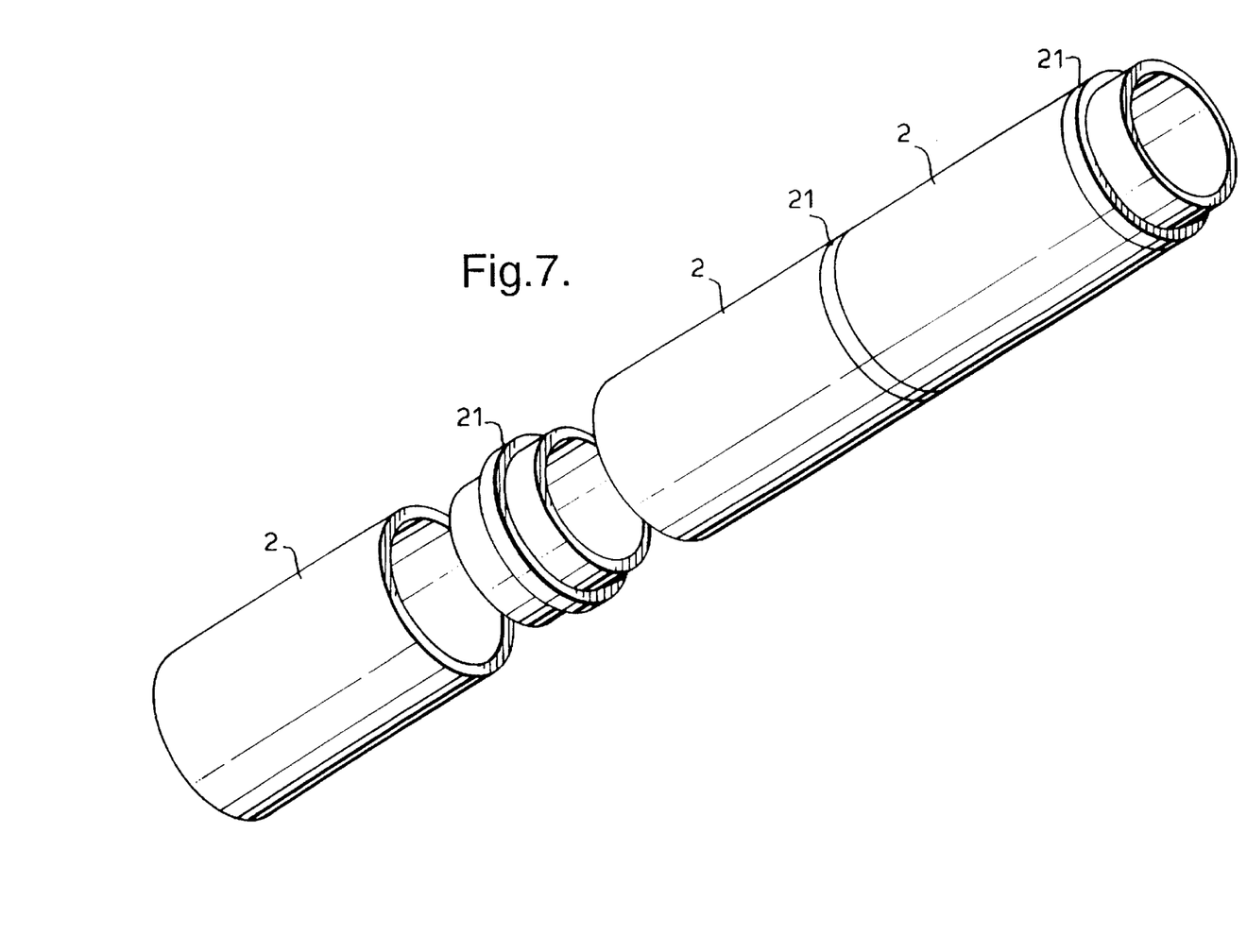
FIG. 7 is an exploded view of an alternative modular former which may be used in the fuel cell of the invention.

FIG. 6 shows an example of former modules 2 which are interconnectable, for example by means of "O" rings 20, or as shown in FIG. 7, of moulded interconnecting units 21, provided these provide gas tight seals. In one example, discrete sections of the optional flexible layer 5 and anode current collector 7 are then applied to the former 2 or modules thereof, and the combined former/former module, flexible layer and anode current collector are then perforated to allow passage of fuel from the fuel source through the cells in use. Each fuel cell element is made up by applying the remaining layers in register with the anode current collector 7. The membrane electrode layer is made from a proton conducting polyelectrolyte membrane with catalyst layers bonded on either side. The catalysts may be platinum, platinum dispersed on a carbon support or platinum alloyed with other metals. For improved performance, the catalyst should contain between 0.2 and 1.00 mg of platinum per cm$^2$ of membrane.

The second electrically conductive layer, the cathode current collector 11, is then applied around the second diffusion backing layer 9, clamped to a known pressure and permanently bonded e.g. by welding or adhesive to apply an inward radial compressive force substantially evenly across the cell. This ensures good conductivity is maintained by minimising interfacial resistance between the cell components. The tubular former is lightweight, yet able to withstand the radial compressive forces applied by the cathode current collector, so saving weight over a conventional stack which requires additional compressive components. The cathode current collector 11 comprises a perforated sheet 13 as this provides good compression and electrical properties whilst minimising the weight of the component and allowing the escape of excess fuel gas. Former modules 2, may be connected together at this time, if they have not been so earlier.

Each fuel cell is connected to the next via the first and second electrically conducting layers 7, 11 of the respective cells. When the required number of cells have been made up the ends are capped.

The fuel source may be provided from an external supply or as a removable canister which may contain a fuel store, such as hydrogen impregnated nano-fibres, a metal hydride or compressed hydrogen. These can be removed and refilled with hydrogen and used again. The metal hydride is chosen to release hydrogen without further heating being required. A removable store is preferred because it reduces weight and bulk over an external supply. The store may connect to the former 2 by a screw thread or push fit and is provided with a seal which is pierced when the store is inserted, so that the fuel can flow through into the cells. If a fuel generator such as a primary hydride is chosen, the complete canister containing the hydride would be disposed of when used up and a new canister inserted. The primary hydride may be activated by heating or by mixing with water.

As an alternative to a separate flexible layer with channels arranged to receive and direct fuel gas, the channels may be provided in the stainless former by cutting grooves, by spark erosion or milling, or by shot blasting through a mask to increase the surface roughness and provide good contact with the carbon cloth of the first diffusion backing layer. Capillary action in the channels prevents water blocking the holes through which the fuel gas enters, thereby reducing the requirement for purging the system with hydrogen gas and so extending the life of the fuel supply.

Figure 8:
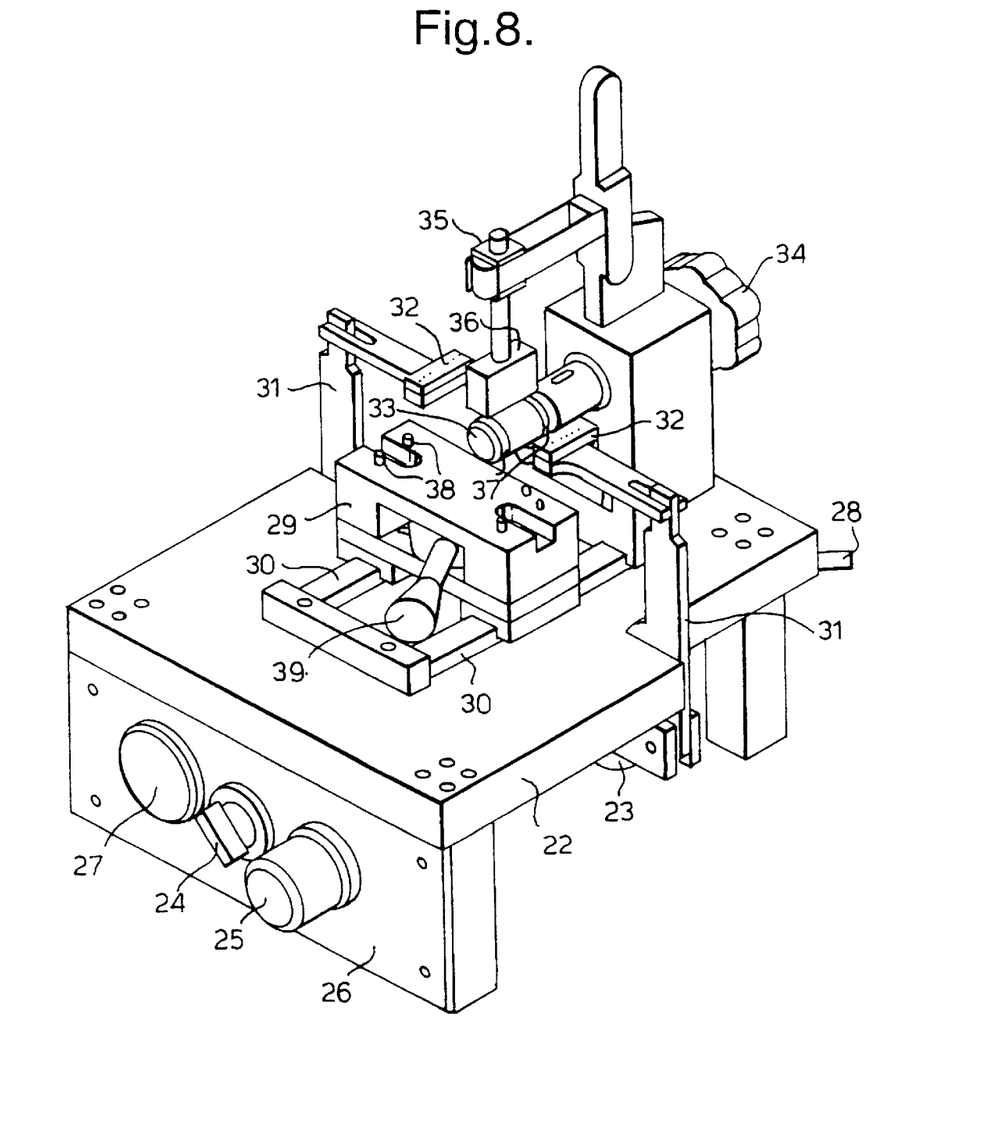
FIG. 8 is a perspective view of a jig for manufacturing the fuel cell of the present invention.

Instead of manufacturing each fuel cell element as described above, they may be manufactured on a jig of the type shown in FIG. 8. This comprises a base plate 22 made of steel. Beneath the base plate is a pneumatic cylinder 23 controlled by a switch 24 and regulator 25 mounted in a front plate 26. A pressure gauge 27 in the front plate provides an indication of air pressure through an inlet 28 from an external air supply (not shown). The jig has a table 29 on linear bearings 30. The table can be adjusted both horizontally and vertically and the jig further comprises a multi-part clamping arrangement with pneumatically controlled pulling arms 31 and holding blocks 32, a tube clamp 33 to receive the former with a clamp knob 34 to hold the former in place and an overhead clamp 35 and clamp block 36.

Construction of a single element is as follows. The air supply to the rig is switched on and the pneumatic switch 24 is closed. The regulator 25 is set to the required pull up pressure and the table 29 is moved into its starting position, away from the clamp and lowered. The clamp knob 34 is loosened, the overhead clamp 35 raised and the block 36 set to a desired height, with the holding blocks 32 on the pulling arms 31 removed from the viscinity of the tube clamp 33.

Insulating tape is applied along the length of the stainless steel former 2 to prevent accidental shorts between the electrically conducting layers and the former is fitted onto the tube clamp 33 and the tube clamp knob 34 is tightened to hold it in place. This operates by means of a pair of rubber rings 37 on the mount which expand when the knob 34 is turned, so that the former 2 is held firmly in place. The cathode current collector layer 11, made of perforated stainless steel, is laid onto the table 29 in engagement with locating pins 38 on the table, then the first diffusion layer 8. The membrane layer 10 is overlaid, locating the first diffusion layer 8 in the membrane area and the second diffusion layer 9 applied, locating it into the top face membrane area. The diffusion layers and membrane layers can be manufactured as a single item in which case the combined layers would be overlaid on the cathode current collector layer 11 in one step.

The table 29 is then slid into position up against the end stops of the linear bearings 30 and the table is raised by operating a lever arm 39 which clamps the raised table in place. The current collector layer 11 is manufactured by photo-fabrication to have a perforated area 13 with substantially the same length as the circumference of the former and at each end of the perforated area there are tabs 14, 15 provided with attachment holes 17 which engage with pins (not shown) on the underside of the pulling arm holding blocks 32. Before engaging the pins, the cathode current collector with the additional layers are wrapped around the former in a substantially cylindrical shape and the tabs are then fitted into place and socket cap head screws tightened to hold the tabs in place.

The pneumatic switch 24 is operated to pressurise the pneumatic cylinder to the desired pressure so that the correct tension is applied to the current collector layer 11 using the pulling arms 31. The tension is increased gradually to 50–60 Kg loading and the tabs 14, 15 have been found to break at the attachment holes 17 at between 60 and 70 Kg loading. Where the tabs overlap the edge of the perforated area they are fixed in place by applying glue with a small probe or by spot welding. The overhead clamp 35 is lowered to hold the layers in a curve until the glue sets, after which the clamp is removed and the pneumatic switch is used to release to the tension on the pulling arms. The ends of the tabs are snapped off at the perforations 18 by repeatedly flexing the metal until it breaks and the fuel cell element is then able to be removed from the tube clamp 33 after undoing the tube clamp knob 34. For production, a benefit of spot welding over gluing, is that the jig is not tied up for the period that the glue takes to set and so the utilisation is increased.

A complete fuel cell may be manufactured by joining multiple elements together via Tufnol™ O-rings and suitable electrical connection. The method described is for manufacture of individual fuel cell elements, with the fuel cell itself being put together manually, but the complete procedure can be mechanised, including testing individual elements and manufactured cells. Failure of one element in a fuel cell stack would not result in all elements being discarded, just in the faulty element being replaced.

The invention will now be particularly described by way of example.

EXAMPLE 1

Figure 9:
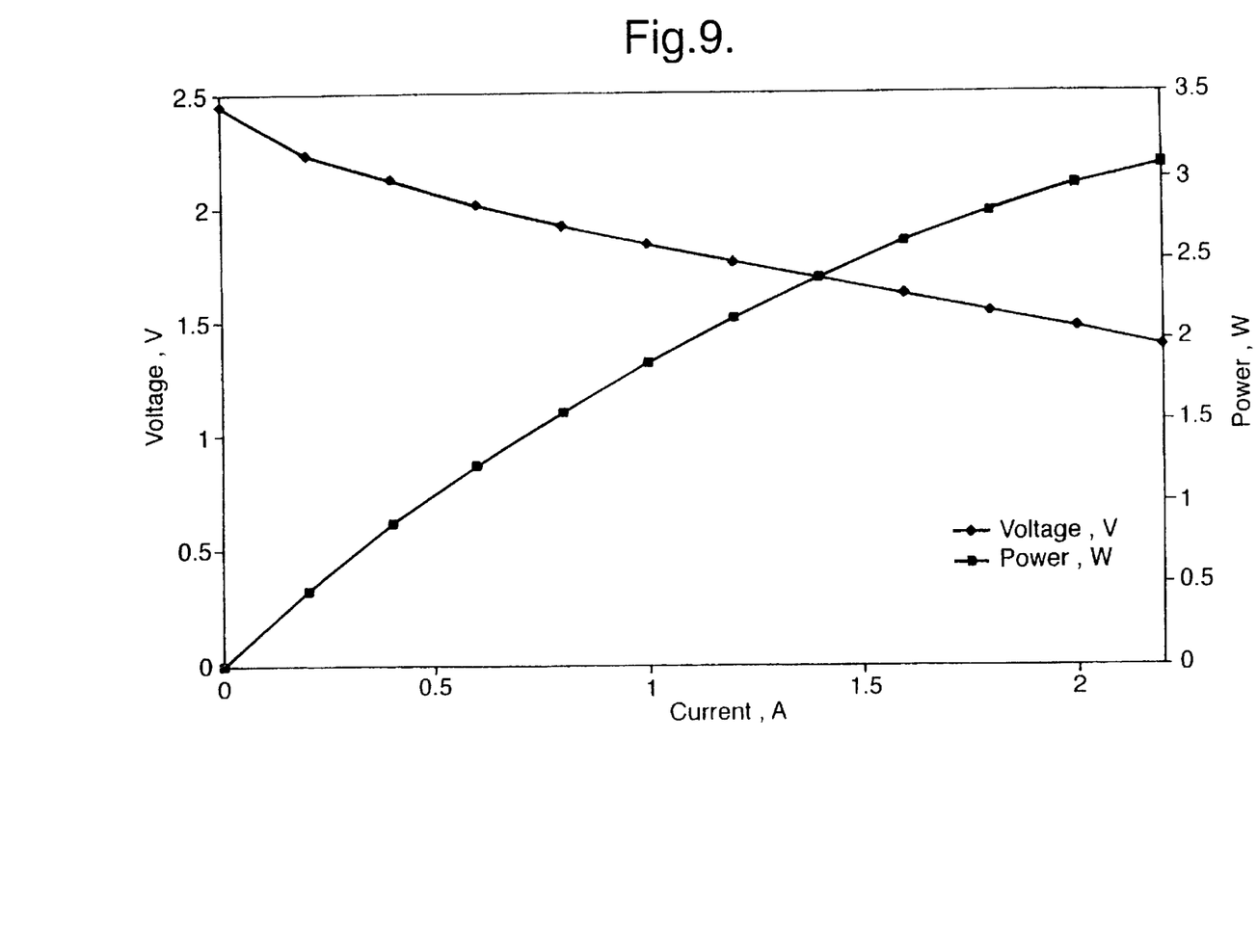
FIG. 9 is a graph showing power and voltage against current for one example of the system of FIG. 1; and, FIG. 10 is a graph showing power and voltage against current arising from the connection of two fuel cells of the system of FIG. 1.

An example of a three cell system was tested. The former was of 2 cm diameter Tufnol™ and each sub-assembly was between 2 and 2.5 cm long. The MEA used was a Gore series 5000 MEA having a 13.1 cm² active area which is typical of commercially available MEA's based on perfluorinated sulphonic acid membranes. The hydrogen was provided from a cylinder of compressed gas. The power produced from each cell was approximately 1W and Table 1 below gives current, voltage and power values measured for the three cell system. FIG. 9 illustrates the data in graphical form. The voltage of the fuel cell system is dependent upon the number of cells present, whereas an increase in the surface area of the cells without increasing the total number of cells will increase the power correspondingly.

TABLE 1

| Current, A | Voltage, V | Power, W |
| --- | --- | --- |
| 0 | 2.45 | 0 |
| 0.2 | 2.24 | 0.448 |

TABLE 1-continued

| Current, A | Voltage, V | Power, W |
| --- | --- | --- |
| 0.4 | 2.13 | 0.852 |
| 0.6 | 2.02 | 1.212 |
| 0.8 | 1.93 | 1.544 |
| 1.0 | 1.85 | 1.850 |
| 1.2 | 1.77 | 2.124 |
| 1.4 | 1.70 | 2.380 |
| 1.6 | 1.63 | 2.608 |
| 1.8 | 1.55 | 2.790 |
| 2.0 | 1.48 | 2.960 |
| 2.2 | 1.4 | 3.080 |

EXAMPLE 2

Figure 10:
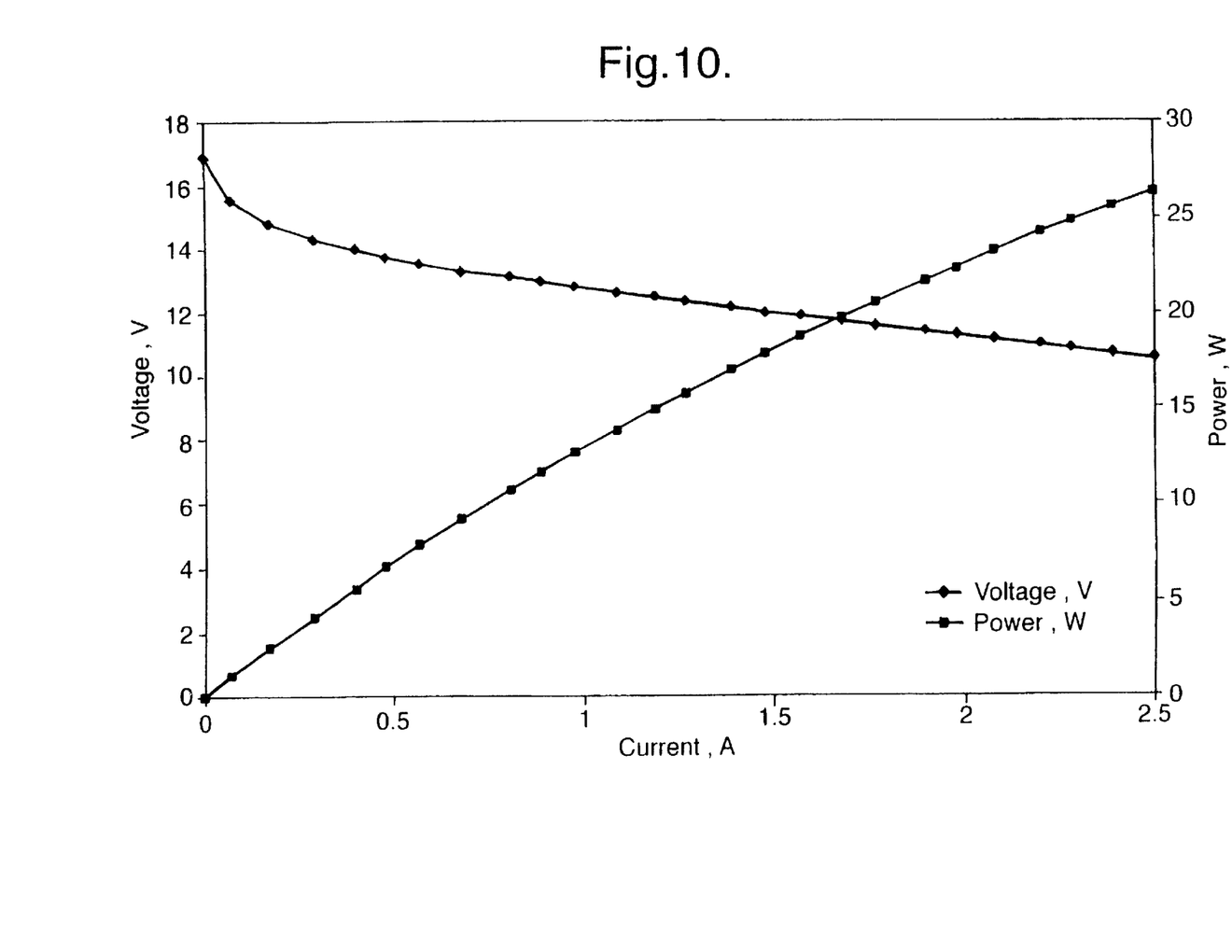

Two multi-element fuel cells as described above, each nominally of 10W power, were linked to create a larger 20W fuel cell unit. This 20W fuel cell unit weighed 270.6 g with each individual element having a surface area of 10 cm². The stack may be run in either series or parallel configuration. The effect obtained with fuel cells linked in series can be seen in table 2 and illustrated graphically in FIG. 10

TABLE 2

| 20 W Demonstrator | | |
| --- | --- | --- |
| Current, A | Voltage, V | Power, W |
| 0.00 | 16.94 | 0.00 |
| 0.07 | 15.55 | 1.09 |
| 0.17 | 14.79 | 2.54 |
| 0.29 | 14.30 | 4.08 |
| 0.40 | 14.00 | 5.52 |
| 0.48 | 13.75 | 6.66 |
| 0.57 | 13.56 | 7.79 |
| 0.68 | 13.31 | 9.10 |
| 0.81 | 13.14 | 10.57 |
| 0.89 | 12.97 | 11.50 |
| 0.98 | 12.80 | 12.55 |
| 1.09 | 12.61 | 13.69 |
| 1.19 | 12.48 | 14.82 |
| 1.27 | 12.35 | 15.63 |
| 1.39 | 12.17 | 16.92 |
| 1.48 | 11.99 | 17.80 |
| 1.57 | 11.89 | 18.72 |
| 1.68 | 11.72 | 19.69 |
| 1.77 | 11.60 | 20.53 |
| 1.90 | 11.42 | 21.64 |
| 1.98 | 11.29 | 22.32 |
| 2.08 | 11.15 | 23.22 |
| 2.20 | 11.01 | 24.21 |
| 2.28 | 10.89 | 24.80 |
| 2.39 | 10.71 | 25.60 |
| 2.50 | 10.54 | 26.39 |

The cells in the fuel cell system undergo thermal cycling in use as they start at ambient room temperature, heat up to between 30° C. and 40° C. in use and then cool down again when switched off This can have a detrimental effect on the efficiency of the cell because each of the different materials expand and contract according to their thermal expansion coefficients and the cell becomes relaxed with time, increasing the interfacial resistance between the layers. This problem is minimised or overcome in the present invention by choosing the materials for the electrically conductive layers 7, 11 and the former 2 to have substantially the same coefficient of thermal expansion. Using stainless steel for all the layers achieves this, or else one example of suitable different materials which comply with this requirement is to have a Tufnol™ former and stainless steel conductive layers.

The diffusion backing layers, gasket and MEA are pre-assembled and are not significantly affected by thermal cycling. The thickness of the MEA is chosen so that it is still flexible when applied around the first electrically conductive member 7, to prevent delamination. Alternate metals which may be used include monel and nickel, preferably the nickel should be gold plated to prevent corrosion.

If the system is to be used in high ambient temperatures, the balance between generation and evaporation of water in the cell is upset and the MEA may become dehydrated. To avoid this an additional layer of a porous, hydrophobic material (not shown) such as perforated cellulose wrapping, expanded polystyrene or polyimide foam is added over the cathode current collector 11. This additional layer does not have an adverse affect on air transport to each cell, but optimises the rate of water loss. In circumstances where there is airborne contamination, e.g. urban pollutants such as benzene or carbon monoxide, an impervious outer shell (not shown) is provided along with an oxygen or air supply to enable continued operation without contaminants poisoning the cells.

Alternatively, or in addition, a fine weave wire mesh (not shown) may be provided on the inside of the cathode current collector. This improves performance by shielding the surface of the assembly from excessive loss of water through exposure to the air, while the cathode current collector retains its function of providing the compression. The fuel cell system of the present invention has application wherever batteries are currently used provided that there is a source of clean air, but the improved power to weight ratio means that the fuel cell system will operate for a far longer period without replacement. The design is lightweight, simple to manufacture and to repair as individual sub-assemblies can be replaced without deconstructing the complete system, and so is particularly suited to man-portable applications.

What is claimed is:

1. A multi-element fuel cell system, the system comprising a substantially cylindrical former; a rechargeable hydrogen fuel source; and a plurality of fuel cell elements; wherein the former comprises a series of interconnecting modules; wherein each former module is perforated to allow passage of fuel to the fuel cell elements; wherein each fuel cell element is positioned radially outwardly of the former, each element being provided with channels, arranged to receive and direct fuel gas, an anode current collector, a gasket, a first diffusion backing layer, a membrane electrode assembly, a second diffusion backing layer and a cathode current collector; wherein the cathode current collector comprises a perforated area and tabs at end designed to interleave; wherein the cathode current collector applies even compression to the fuel cell element, such that electrical contact is maintained within each fuel cell element; wherein the fuel cell elements are electrically connected in series via respective anode and cathode current collectors; wherein the fuel cell elements at each end of the former are capped for connection to equipment; wherein the former and current collectors have substantially the same coefficient of thermal expansion; and wherein the fuel source is coupled to the fuel cell elements.

2. A multi-element fuel cell according to claim 1, wherein the former acts as the anode current collector.

3. A multi-element fuel cell system according to claim 1 the system further comprising an outer porous, hydrophobic layer, such that rate of loss of water from the membrane electrode assembly during operation is optimised.

4. A multi-element fuel cell system according to claim 3, wherein the outer layer is chosen from one of perforated cellulose wrapping, expanded polystyrene and polyimide foam.

5. A multi-element fuel cell system according to claim 1, wherein the hydrogen fuel source comprises one of a hydrogen store or a hydrogen generator.

6. A multi-element fuel cell system according to claim 1, wherein the hydrogen source comprises a metal hydride of up to 2 wt % $H_2$, a primary hydride, compressed hydrogen or hydrogen stored in carbon nanofibres.

7. A multi-element fuel cell system according to claim 1, wherein the hydrogen source is provided in a replaceable cartridge.

8. A multi-element fuel cell system according to claim 1, wherein the membrane electrode assembly comprises a catalyst of platinum deposited on a carbon support.

9. A multi-element fuel cell system according to claim 8, wherein the catalyst comprises between 0.2 and 1.0 mg of platinum per $cm^2$.

10. A multi-element fuel cell system according to claim 1, wherein the cathode current collector and the former comprise stainless steel.

11. A multi-element fuel cell system according claim 1, wherein the tabs of the cathode current collector are fastened in place by spot welding.

12. A multi-element fuel cell according to claim 1, wherein a fine wire mesh is provided in contact with the interior surface of the cathode current collector.

13. A multi-element fuel cell system according to any preceding claim 1, further comprising an impervious outer shell and means for ensuring air flow to the fuel cell elements beneath the outer shell.

14. A method of manufacturing a multi-element fuel cell system, the method comprising laying down a cathode current collector, a first diffusion backing layer, a membrane electrode assembly, and a second diffusion backing layer to form a stack; wherein the cathode current collector comprises a perforated area with tabs at each end, folding the stack around a former; interleaving the cathode current collector tabs; applying a predetermined pressure to the cathode current collector to ensure contact between the stack and the former; fastening the cathode current collector in place to form a fuel cell element; and connecting a plurality of fuel cell elements together to form a fuel cell.

15. A method according to claim 14; wherein the tabs of the cathode current collector are fastened in place by spot welding.

16. A method according to claim 14; wherein the cathode current collector is formed by photo-fabrication.

17. A method according to claim 14, further comprising capping the ends of a fuel cell for connection to equipment; and coupling the fuel cell to a fuel source.

18. A method according to any of claim 14, further comprising applying a porous, hydrophobic layer over the cathode current collector, such that rate of loss of water from the system is optimised.

* * * * *